Patented May 24, 1949

2,470,752

UNITED STATES PATENT OFFICE 2,470,752

INTERPOLYMER PRODUCED FROM POLYHYDRIC ALCOHOL, POLYBASIC ACID, AND INTERPOLYMER OF MONOVINYLAROMATIC COMPOUND, OLEFINIC ACID, AND DRYING OIL OR OIL FATTY ACID

Edward G. Bobalek, Cleveland, Ohio, assignor to The Arco Company, Cleveland, Ohio, a corporation of Ohio No Drawing. Application June 2, 1947, Serial No. 751,966

11 Claims. (Cl. 260—22)

The present invention relates to a novel type of resinous polymer, and is more particularly concerned with the product produced from a reaction of from 30 to 80 per cent of (1) a non-gelled interpolymer of (a) a monovinylaromatic compound, (b) a monocarboxylic olefinic acid having a carbon chain length up to four carbon atoms, exclusive of carboxyl groups, and (c) an unsaturated drying oil fatty acid or ester; (2) a polyhydric alcohol containing at least three hydroxyl groups per molecule; and (3) a polybasic acid. The invention further relates to a method for the production of the new polymeric material, and to surface coatings produced therefrom.

The resinous product of the present invention is produced by the interpolymerization of three starting materials. The first is (1) a non-gelled interpolymer of (a) a monovinylaromatic compound, in amount between about ten and about sixty per cent by weight, (b) a monocarboxylic olefinic acid having a carbon chain length up to four carbon atoms, exclusive of carboxyl groups, in amount between about two and twenty-five per cent by weight of the monovinylaromatic compound, and (c) a compound selected from drying oil fatty acids and esters having a specific degree of unsaturation. These reactants are first polymerized together to a point short of gelation, and this product, in amount between 30 and 80 per cent by weight, preferably between 50 and 80 per cent by weight, is thereafter reacted with (2) a polyhydric alcohol and (3) a polybasic acid, either in the order stated or with the polyhydric alcohol and polybasic acid simultaneously or in admixture.

The polymeric product of the present invention is especially suited for use as a surface-coating material, inasmuch as films produced therefrom are glossy, exceedingly tough, and exceptionally resistant to water, alkali, and general exposure. Paint and varnish films embodying the product of the present invention also exhibit the above characteristics, and in addition are exceedingly retentive of flexibility and adhesive qualities under weathering conditions. The product is compatible with many of the usually employed paint and varnish solvents, showing excellent color and clarity in solutions thereof. A preferred application of the polymer of the instant application is in the field of baking and air-drying enamels, where it surpasses in quality ordinary oleoresinous varnishes and the ordinary oil-modified glyceryl phthalate resins.

By "monovinylaromatic," as employed in this specification, is meant a compound containing at least a phenyl or naphthyl radical in combination with a vinyl group, and otherwise structurally similar to styrene. The phenyl group may contain substituents, as, for example, fluorine, chlorine, methoxy, hydroxy, methyl, trichloromethyl, or trifluoromethyl. As representative compounds included within the scope of "monovinylaromatic compound" may be mentioned styrene itself, para-methylstyrene, para-chlorostyrene, para-fluorostyrene, meta-chlorostyrene, meta-fluorostyrene, meta- and para-trichloromethylstyrene, meta- and para-trifluoromethylstyrene, ortho- and meta-hydroxystyrene, methoxystyrenes, vinylnaphthaline, and the like. Substituents may also be present on the vinyl group, as in alpha-methylstyrene, but of course not in a manner such as to retard polymerization. Especially preferred monovinylaromatic compounds are the styrene derivatives, and particularly styrene itself, alpha-methylstyrene, and fluorostyrene.

The monocarboxylic olefinic acid employed in the method of the present invention has a chain length up to four carbon atoms exclusive of carboxyl groups, and may contain substituents of a hydrocarbon nature, e. g., phenyl, methyl, or halogen, on a chain carbon atom. As representative olefinic acids may be mentioned crotonic acid, methacrylic acid, alpha-chloroacrylic acid, acrylic acid, and cinnamic acid. Esters and aldehydes are not operative for the production of the desired results, and the invention is therefore limited to the employment of the previously characterized olefinic acids.

The at least partially conjugated drying oil or oil fatty acid may be any one of the at least partially unsaturated drying oils, which usually exist chiefly as the glycerides of certain complex unsaturated straight-chain organic acids, the oil fatty acids themselves, or synthetic esters of the drying oil fatty acids. The unsaturated drying oil or acid, to be operative in the method of the present invention, should have an average double bond content, as determined by iodine number (which is the experimental measure of unsaturation) at least as great as that for dehydrated castor oil (a minimum of approximately 133 Woburn), according to specifications and examples published by J. D. von Mikusch and Charles Frazier, Ind. Eng. Chem., Anal. ed. 13, 782–789 (1941); 15, 109–113 (1943), but no greater than that of beta-eleostearic acid (approximately 274 Woburn). As ordinarily obtained from commercial sources, the drying oils consist chiefly of glycerides of the drying oil fatty acids, which acids may be liberated from the oils by saponification and acidulation of separated acid salts. The oil acids thus obtained may, if desired, be esterified with monohydric or polyhydric alcohols according to usual esterification procedures. These esters are usually referred to as synthetic drying oil esters, and are similar to the natural oil in many respects. Ordinarily, these natural fatty acid glyceride esters, the natural drying oil fatty acids, or various synthetic esters of the same, are processed by commercial suppliers according to various procedures which effect an average double bond content and degree of conjugation such as to render the processed oils or acids suitable for employment in the present invention. Either the oil, the acid, or synthetic esters may be employed in the method of the present invention. The procedure when the oil fatty acids are employed is somewhat more facile than when the esters are employed, inasmuch as the tendency toward gelation is considerably less. Mixtures of mono-drying oils, or of oils with acids, may also be employed, but whether in the pure or mixed state, the requirement for unsaturation remains the same. Drying oils and acids having a greater or lesser average double bond content than that prescribed above are unsuited for use, and, if the necessary unsaturation is not present in the oil or acid as introduced into the reaction zone, then heating or other reaction conditions must be sufficient to produce the same therein. As representative drying oils and acids which may be employed, for example, are dehydrated castor oil, conjugated linseed oil fatty acids, isomerized walnut oil, conjugated soya oil, and blends of these unsaturated oils and acids with oils such as soya and castor.

The specifications of a typical oil fatty acid which may be advantageously employed in the procedure of the present invention are as follows:

1. Iodine No. _____ 143–153 (WIJS)
   178–187 (Woburn)
2. Color _____ 1–2
3. Acid No. _____ 197.5 to 199
4. Saponification No._ 198.5 to 199.5
5. Ester value _____ 0–1.5
6. Hexabromide value  0–3
7. WIJS on ice for 3
   minutes, iodine
   value _____ 115–120 (62–73 Woburn)
8. Conjugation (by
   difference) _____ 60–65
9. Titre value _____ 18–24
10. Spec. gravity _____ 0.9201 at 25° C.
11. Viscosity _____ A+ to F (Gardner-Holdt scale at 77° F.

As the polybasic acid of the present invention may be employed any polybasic acid or the anhydride thereof, such as the dibasic acids, malonic, succinic, glutaric, adipic, sebacic, methylmalonic, maleic, itaconic, perfluoroglutaric, perfluoroadipic, and phthalic; tribasic acids such as 1,2,4-butanetricarboxylic acid, and the like. At least a portion of a polybasic acid must always be introduced, and, for the production of the most desirable product, sufficient of the polybasic acid should be added to render the ratio of hydroxyl groups to carboxyl groups between about 1.1 and 2.0 to 1, and preferably between about 1.1 and 1.6 to 1. This ratio allows the polybasic acid to react with the required excess of polyhydric alcohol, and thereby effects considerable cross linkage.

As polyhydric alcohols which may be utilized in the method of the invention may be employed, for example, glycerol, pentaerythritol, polyallyl alcohol, mannitol, sorbitol, erythritol, trimethylol propane, and similar other alcohols containing at least three hydroxyl groups, inasmuch as this property allows for greater cross-linkage possibilities. The amount of polyhydric alcohol employed is always in excess of that amount theoretically necessary to neutralize all carboxyl groups in the reaction, usually between about 5 and about 20 per cent by weight of the starting reactants, and is ordinarily such as to allow a ratio of hydroxyl groups to carboxyl groups in the reactants between about 1.1 and 2.0 to 1, and preferably between about 1.1 and 1.6 to 1.

The first step in the method of the present invention essentially comprises the admixture of (a) from 10 to 60 per cent by weight of a monovinylaromatic compound monomer, (b) from about 2 to 25 per cent by weight of the monovinylaromatic compound of a monocarboxylic olefinic acid having a carbon chain length up to four carbon atoms, exclusive of carboxyl groups, and (c) a compound selected from drying oil fatty acids and esters having an average double bond content, as determined by iodine number, at least as great as that of dehydrated castor oil and not in excess of that of beta-eleostearic acid, preferably in the presence of an addition polymerization catalyst such as benzoyl peroxide, ditertiarybutyl peroxide, or oxygen. The reaction mixture is heated together at a polymerization temperature between about 100 and 180 degrees centigrade, preferably between about 130 and 160 degrees centigrade, for a period of time sufficient to produce a non-gelled resinous product having a viscosity generally in excess of about K on the Gardner-Holdt scale at 77 degrees Fahrenheit.

The polymerization usually demands a time period of about two to eight hours at the preferred temperatures given, with the time being correspondingly decreased or increased by the employment of higher or lower temperatures, respectively. For example, while the reaction period is usually between about two and eight hours when a temperature of 130 to 160 degrees centigrade is employed, reduction of the reaction temperature to about 100 degrees centigrade usually demands an increase in the reaction period to about 10 to 12 hours.

A preferred manner of conducting the interpolymerization is to admix the starting reactants at a temperature below about 130 degress centigrade, and thereafter to raise the temperature slowly over a period of about one-half to two hours to about 180 degrees centigrade, whereafter it may be rapidly elevated to between 200 and 250 degrees centigrade, preferably to about 220 degrees centigrade, and an inert gas, e. g., nitrogen or carbon dioxide, blown through the mixture of reaction products to remove unreacted monovinylaromatic compound and olefinic acid monomer. If the preferred procedure given above is not employed, the mixture of reaction products may be gas-blown at a somewhat more elevated temperature at the end of a satisfactory reaction period, or the monomer may be removed in other suitable manner, if desired, such as by distillation.

In general, if the reaction mixture has attained a viscosity indicating the proximate gelation of the interpolymer product, it is desirable to eliminate the unreacted, volatile monomers by distillation or with a current of inert gas at temperatures less than 200 degrees centigrade prior to admixture of the polyhydric alcohol and dibasic acid and elevation of the temperature to the preferred ranges for esterification. In instances where the time of attainment of gelation viscosity is remote, the unreacted monomers can be eliminated during the subsequent esterification state of the process, and a special step to remove unreacted monomers prior to addition of the polyhydric alcohol and dibasic acid is unnecessary.

The polyhydric alcohol and polybasic acid may be reacted with from 30 to 80, preferably 50–80 percent of the primary interpolymer in any suitable manner according to conventional resin-forming procedure. Thus the alcohol may be added first and then the polybasic acid, or both may be added at the same time in admixture or separately. However, certain advantages accrue to the use of specific procedure when operating with different types of constituents, and therefore, when less than about two-thirds of the non-monovinylaromatic compound and non-olefinic acid portion of the basic interpolymer consists of oil fatty acids, it is advantageous to heat the polyhydric alcohol and the primary interpolymer together for a short time before addition of the polybasic acid. However, when this portion of the basic interpolymer consists of more than about two-thirds oil fatty acids, no advantage is ordinarily gained by employment of such procedure, and the polyhydric alcohol and polybasic acid are usually introduced into the reaction at the same time.

The reaction of the basic interpolymer with the excess of polyhydric alcohol, in the absence of the polybasic acid, may be accomplished by any known procedure, but advantageously by heating together, at a temperature satisfactory for alcoholysis, the basic interpolymer and the selected polyhydric alcohol. This is usually in the presence of a catalyst, such as litharge or calcium stearate, and at a temperature between about 130 and 250 degrees centigrade, preferably at a temperature between about 200 and 250 degrees centigrade. This usually demands from about one-half to 4 hours at the preferred temperatures given.

The procedure employed for the step in which the polybasic acid is introduced into the reaction mixture after addition and preliminary reaction of the polyhydric alcohol with the interpolymer (1) involves maintenance of the temperature at a desired resin-forming level, e. g., 130–290 degrees centigrade, usually between about 210 and 290 degrees centigrade, preferably between about 230 and 250 degrees centigrade, while a current of inert gas, e. g., nitrogen or carbon dioxide, is blown through the reaction mixture to promote removal of the water of esterification. The temperature may then be elevated rapidly, usually within about two hours from the time of addition, until drops of the resin, when cooled on glass, are clear. Prior to this state, a chilled drop of the reaction mixture is quite cloudy and has a waxy texture, indicating incompatibility of the resinous components. Likewise, films cast from the material prior to the high temperature thermal treatment have inferior characteristics.

Instead of raising the temperature rapidly, the reaction mixture may be maintained at any resin-forming temperature, usually within the range of about 210 to 290 degrees centigrade, until clarity is observed in the cooled resin, and, if this procedure is employed, the temperature is advantageously maintained at above about 230 degrees centigrade. However, the procedure wherein the temperature is raised rapidly is considered somewhat more desirable.

If the polyhydric alcohol and polybasic acid are introduced into the reaction at the same time, as is usually the practice when drying oil fatty acids make up at least about two-thirds of the non-monovinylaromatic compound and non-olefinic acid portion of the primary interpolymer, the reaction mixture may be maintained at a resin-forming temperature of 210–290 degrees centigrade, usually above about 230 degrees centigrade, until cooled drops of the resin are clear. The temperature is, however, also in this case preferably elevated rapidly until compatibility is noted, usually within less than about two hours after addition. According to the usual procedure of the fusion process, it is always advantageous to employ blowing of an inert gas, e. g., carbon dioxide, through the reaction mixture to assist in the removal of water therefrom. The reaction is continued in all cases until attainment of the desired clarity, and a resin-forming temperature e. g., 210–290 degrees centigrade, may be maintained until the acid value of the resin is less than 40, preferably less than about 10. The reaction may then be checked at any desirable extent prior to gelation, conveniently by diluting the resin to a solution of about 60 per cent non-volatile solids with a petroleum hydrocarbon having a boiling point within the range 150 to 200 degrees centigrade, or other suitable solvent.

If desired, solvents such as toluene, xylene, dipentene, or moderately low-boiling aliphatic hydrocarbons may also be incorporated into either the polymerization or the esterification mixture, and the reaction conducted under temperature conditions regulated according to the maximum volume of reflux which can be controlled in the particular apparatus employed. The reaction container may, for example, be provided with a reflux condenser having a receiver whereby the mixed solvent-water condensate is collected and whereby the separated water may be withdrawn while the solvent is returned to the reaction container at a rate sufficient to replace the quantity removed by distillation. In such operation, carbon dioxide or other inert gas is not used, except perhaps as a protective blanket to inhibit oxidation. Although the solvent process as outlined above may be employed successfully in a few instances, it is, however, generally entirely inoperative or productive of much less desirable products than can be derived by the fusion method.

The following examples are given to illustrate the practice of the present invention, but are not to be construed as limiting. Other reaction products of a monovinylaromatic compound, olefinic acid, and drying oil fatty acid or ester which are suitable as the primary interpolymer, (1), in the practice of the present invention are disclosed in my copending application Serial 751,965, filed June 2, 1947, and may be ascertained by reference thereto.

*Example 1*

A mixture of 310 grams of styrene, 65 grams of crotonic acid, 75 grams of dehydrated castor oil fatty acids, 135 grams of dehydrated castor oil having a viscosity from U to V on the Gardner-Holdt scale at 77 degrees Fahrenheit, and eight grams of benzoyl peroxide were introduced into a three-neck, one-liter flask provided with a mechanical stirrer, thermometer, and reflux condenser. The mixture was heated at a temperature between 130 and 155 degrees centigrade for a period of about two hours. The reflux condenser was then removed and a current of carbon dioxide blown through the reaction mixture while the temperature was elevated over a period of about one hour to 200 degrees centigrade. About 500 grams of reaction product was then recovered, which, when cooled to room temperature, was quite cloudy and exhibited inferior film-forming properties.

Eighty grams of glycerol and 0.3 grams of litharge were added to 400 grams of the above reaction product, and the mixture of reactants heated for one-half hour at a temperature of 230 to 245 degrees centigrade, whereafter 100 grams of phthalic anhydride was introduced into the reaction. The temperature was then elevated in a period of less than 30 minutes to about 250 degrees centigrade, and maintained at this level until a drop of the reaction mixture, when chilled on glass, formed a clear and resinous pill. The temperature was then reduced to about 205 degrees centigrade over a period of one-half to one hour, and the reaction checked short of gelation by dilution of the resin with an equal weight of xylene. The resin at this point had an acid value of about nine, and the viscosity of a 50 per cent solution of this resin in xylene was W-X on the Gardner-Holdt scale at 77 degrees Fahrenheit.

This resin was found to be particularly useful as a vehicle for air-drying and baking films. Paint and varnish films based on this resin were characterized by excellent gloss, toughness, superior exterior durability, and excellent color retention under baking or weathering conditions.

Example 2

The procedure of Example 1 is repeated using conjugated linseed oil fatty acids instead of the dehydrated castor oil and oil fatty acids, and pentaerythritol instead of glycerol. The reaction product thus produced is very similar to that of Example 1, and exhibits excellent surface-coating properties.

Example 3

The procedure of Example 1 is repeated, employing, instead of the styrene, an equal amount of alpha-methylstyrene. The resinous interpolymer thus produced is very similar to that produced with styrene itself, and lends superior durability and toughness to paint and varnish films embodying the same.

Example 4

The process of Example 1 is repeated, using instead of the styrene, 350 grams of para-fluorostyrene. The reaction product is a resinous interpolymer very similar to that produced from styrene itself, showing enhanced durability and resistance to water, alkali, and general exposure in paint and varnish films.

Example 5

The procedure of Example 1 is repeated, using an equal quantity of adipic acid in place of the phthalic anhydride and an equal portion of conjugated linseed oil fatty acids instead of the dehydrated castor oil fatty acids. The resinous interpolymer produced from this reaction is very similar to that of Example 1, and is characterized by excellent gloss and toughness, together with superior exterior durability, flexibility, and color-retention under baking or weathering conditions.

Coating compositions prepared from the polymer of the present invention and a number of driers, pigments, and resins are especially suitable for employment as varnishes and baking enamels, inasmuch as films formed therefrom exhibit excellent toughness, durability, and resistance to alkali, water, and exposure. Driers which may be advantageously incorporated with the interpolymer are metallic naphthenates, such as those of cobalt, manganese and lead. As pigments that may be used as ingredients of the said coatings may be mentioned zinc oxide, titanium dioxide, and iron blue. Among the resins which may be advantageously employed in combination with the interpolymer of the present invention, to allow production of a surface coating having superior characteristics, are included oil-soluble phenol-aldehyde resins, melamine or urea resins, pentaerythritol esters of rosin, ester gum, and, in general, many other hard varnish resins. Such a resin is preferably employed in a minor proportion, e. g., in amount up to about 30 per cent by weight of the mixture.

For the preparation of surface coatings from the interpolymer of the present invention, the resin may be diluted to any desirable extent with a common varnish solvent, mineral spirits and xylene being somewhat preferred. The concentration should usually be between about 50 to 60 per cent of non-volatile solids, and films produced from such solutions have been found especially desirable. The exact concentration employed, however, is not significant, as it has been found that variation of the solids content over a reasonable range does not materially affect the quality of the films.

Various modifications may be made in the invention without departing from the spirit or scope thereof, and it is to be understood that I limit myself only as defined in the appended claims.

I claim:

1. An ungelled resinous interpolymer formed from about 30 to 80 percent by weight of (1) an ungelled interpolymer produced from (a) a monovinylaromatic compound selected from the group consisting of styrene, vinylnaphthalene, fluorostyrene, chlorostyrene, methoxystyrene, hydroxystyrene, methylstyrene, trifluoromethylstyrene, trichloromethylstyrene, and alpha-methylstyrene, in amount from about 10 to 60 percent by weight, (b) a monocarboxylic olefinic acid containing a single olefinic carbon-carbon linkage and the carboxyl group as sole functional group, at least one hydrogen atom on the beta-carbon, and an aliphatic carbon chain length up to four carbon atoms, exclusive of carboxyl groups, in amount from about 2 to 25 percent by weight of the monovinylaromatic compound, and (c) a compound selected from the group consisting of drying oils and drying oil fatty acids having an average double bond content, as determined by Woburn iodine number, between about 133 and 274; the remaining 70 to 20 percent by weight of the starting reactants being (2) a polyhydric alcohol containing as sole functional groups at least three and not more than six hydroxyl groups per molecule, and (3) a polybasic organic acid selected from the group consisting of saturated and unsaturated polybasic acids containing carboxyl groups as sole functional groups; the relative proportions of polyhydric alcohol (2) and polybasic acid (3) being such as to render the ratio of hydroxyl groups to carboxyl groups in the starting reactants between about 1.1 and 2.0 to 1, said resinous interpolymer having an acid value below about 40.

2. The product of claim 1, wherein the amount of the primary interpolymer (1) in the polymeric product is between 50 and 80 per cent by weight.

3. The product of claim 1, wherein the monovinylaromatic compound (a) is styrene.

4. The process for the production of a resinous interpolymer which includes the step of polymerizing, by heating together at a resin-forming temperature between about 130 and 290 degrees centigrade, from 30 to 80 percent by weight of (1) an ungelled interpolymer produced from (a) a monovinylaromatic compound selected from the group consisting of styrene, vinylnaphthalene, fluorostyrene, chlorostyrene, methoxystyrene, hydroxystyrene, methylstyrene, trichloromethylstyrene, trifluoromethylstyrene, and alpha-methylstyrene, in amount from about 10 to 60 percent by weight, (b) a monocarboxylic olefinic acid containing a single olefinic carbon-carbon linkage and the carboxyl group as sole functional group, at least one hydrogen atom on the beta-carbon, and an aliphatic carbon chain length up to four carbon atoms, exclusive of carboxyl groups, in amount from about 2 to 25 percent by weight of the monovinylaromatic compound, and (c) a compound selected from the group consisting of drying oils and drying oil fatty acids having an average double bond content, as determined by Woburn iodine number, between about 133 and 274; the remaining 70 to 20 percent by weight of the starting reactants being (2) a polyhydric alcohol containing as sole functional groups at least three and not more than six hydroxyl groups per molecule, and (3) a polybasic organic acid selected from the group consisting of saturated and unsaturated polybasic acids containing the carboxyl groups as sole functional groups; the relative proportions of polyhydric alcohol (2) and polybasic acid (3) being such as to render the ratio of hydroxyl groups to carboxyl groups in the starting reactants between about 1.1 and 2.0 to 1, until an acid value below about 40 is attained in the resin.

5. The process of claim 4, wherein the amount of (1) in the polymeric product is between 50 and 80 per cent by weight.

6. The process of claim 4, wherein the monovinylaromatic compound (a) is styrene.

7. The process of claim 4, wherein unreacted monomers are removed from the basic interpolymer (1) before reaction therewith of the other reactants.

8. The process of claim 4, wherein the polyhydric alcohol (2) is heated together with the primary interpolymer (1) before addition of the polybasic acid (3).

9. The process of claim 8, wherein the polyhydric alcohol (2) and primary interpolymer (1) are heated together between 130 and 250 degrees centigrade, and wherein the reaction is maintained at a temperature between 210 and 290 degrees centigrade after addition of polybasic acid (3).

10. The product of claim 1, wherein (a) is styrene and (b) is crotonic acid.

11. The process of claim 4, wherein (a) is styrene and (b) is crotonic acid.

EDWARD G. BOBALEK.

REFERENCES CITED

The following references are of record in the file of this patent:

UNITED STATES PATENTS

| Number | Name | Date |
|---|---|---|
| 2,276,176 | Flint et al. | Mar. 10, 1942 |
| 2,407,479 | D'Alelio | Sept. 10, 1946 |